United States Patent [19]

Tarr

[11] 4,054,085
[45] Oct. 18, 1977

[54] ADAPTER FOR COFFEE BREWER

[76] Inventor: James Philip Tarr, 7027 Forest Moss, San Antonio, Tex. 78238

[21] Appl. No.: 688,528

[22] Filed: May 21, 1976

[51] Int. Cl.² .................................. A47J 31/44
[52] U.S. Cl. .................................. 99/284
[58] Field of Search ............ 99/284, 279, 302-322, 99/323.3; 141/367, 368, 152

[56] References Cited
FOREIGN PATENT DOCUMENTS

| 140,967 | 4/1951 | Australia | 99/302 R |
|---|---|---|---|
| 518,369 | 3/1953 | Belgium | 99/302 R |
| 989,478 | 5/1951 | France | 99/315 |
| 315,837 | 10/1956 | Switzerland | 99/302 R |

Primary Examiner—Philip R. Coe
Attorney, Agent, or Firm—Gunn & Lee

[57] ABSTRACT

The present invention relates to an adapter for converting a standard eight cup coffee brewer to the commercial type that will brew 12 cups. The stand for the eight cup coffee brewer is disconnected from the base, and an adapter is inserted between the stand and the base. The adapter raises the stand to allow additional clearance for a 12 cup coffee pot, the standard commercial size. The stand is again connected to the base with the adapter inserted therebetween. The adapter has an additional electrical outlet connected to the electrical system for the coffee brewer, which outlet may be used as an additional hot plate connection to maintain an additional pot of brewed coffee at the proper temperature.

2 Claims, 3 Drawing Figures

ADAPTER FOR COFFEE BREWER

BACKGROUND OF THE INVENTION

This invention relates to coffee brewers and, more particularly, to an adapter for converting an eight cup coffee brewer to a twelve cup coffee brewer, the standard commercial size.

BRIEF DESCRIPTION OF THE PRIOR ART

Several years ago, various types of semi-automatic coffee brewers came on the market. Basically, these coffee brewers consisted of a base with a hot plate on one end and a stand attached to the rear of the base. Attached to the top of the stand and extending over the hot plate was head portion that may or may not have been connected to a water line. Below the head portion and immediately above the hot plate was located an insertable funnel that held a filter. The filter was used to hold the coffee. If the insertable funnel was in position with the filter filled with coffee, by tripping a switch, a flow control device would cause a predetermined amount of hot water to flow from a hot water tank in the head portion through the filter to brew the coffee. Coffee brewers not connected to a water line required water to be added to the hot water tank through an opening in the top thereof. The coffee would be collected below the filter in a coffee pot located on the hot plate.

Of the types of coffee brewers described hereinabove, a standard eight cup brewer was developed predominantly for use in the home. However, due to increased demand of the above described coffee brewers, the 12 cup commercial coffee brewer has become the standard unit. The eight cup coffee brewer developed for home use became an odd size with the pots not normally being stocked by most suppliers. The twelve cup coffee pot would not fit between the limited space of the insertable funnel containing the filter and coffee and the hot plate. Due to the odd size of the eight cup coffee pot, and the difficulty in replacing the coffee pot, many of the coffee brewers having eight cup capacity became obsolete without replacement parts. The eight cup coffee brewers could no longer be used for lack of coffee pots even though they still functioned properly.

SUMMARY OF THE INVENTION

The present invention relates to an adapter for converting an eight cup coffee brewer to a twelve cup coffee brewer so that the standard eight cup coffee brewer can receive a twelve cup coffee pot. The adapter comprising the present invention is insertable between the base of the standard eight cup coffee brewer and the stand. This raises the stand a predetermined distance to receive the twelve cup coffee pot. The adapter has the same rectangular configuration as the stand. Screws extend through flanges to attach the stand through the adapter to the base of the coffee brewer. Also, the adapter provides for an additional electrical outlet with a control switch whereby an additional item, such as a warming plate may be plugged in to maintain an additional pot of coffee at a desired temperature. The electrical outlet is connected to the inlet line of AC power received by the coffee brewer.

DESCRIPTION OF THE PREFERRED EMBODIMENT

Figure 1:
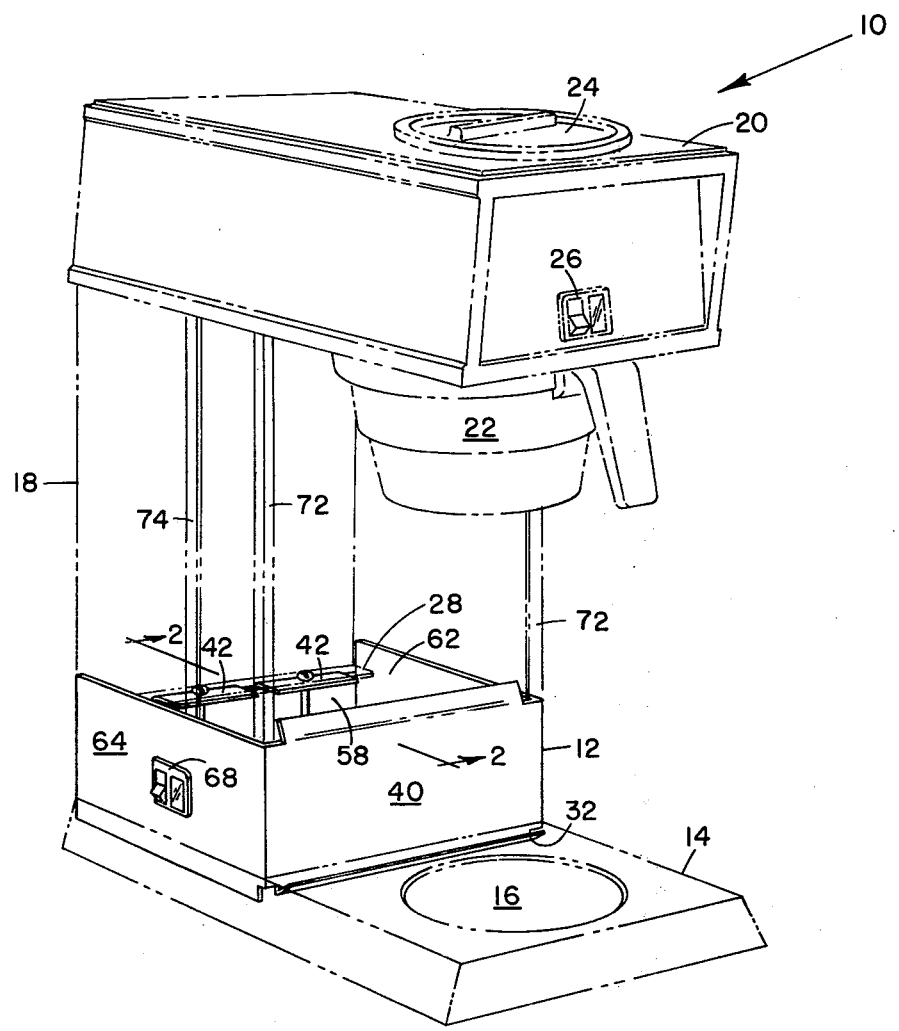
FIG. 1 is a perspective view of the adapter being used to convert a standard eight cup coffee brewer to a twelve cup coffee brewer.

Referring now to FIG. 1 of the drawings, there is shown a standard eight cup coffee brewer in reference lines represented generally by the reference numeral 10 with the adapter 12 converting it to a twelve cup coffee brewer. The coffee brewer 10 has a base 14 with a hot plate 16 located in the forward portion of the base 14. Previously, the stand 18 connected to the rear portion of the base 14 without the adapter 12 inserted therebetween. A head portion 20 is connected to the stand 18 with the head portion extended forwardly therefrom over the hot plate 16. Immediately above the hot plate 16 and under the head portion 20 is located an insertable funnel 22 that will slide into position below head portion 20. The insertable funnel 22 normally contains a paper filter (not shown) in which the coffee to be brewed is to be poured. The type of coffee brewer 10 shown in FIG. 1 has a top 24 through which a predetermined amount of water is poured into a hot water tank (shown in schematic of FIG. 3). Because the hot water tank maintains a predetermined amount of water in the tank close to boiling temperature, the additional water will cause the tank to overflow through funnel 22 thereby brewing the coffee. The hot water tank remains hot as long as the coffee brewer 10 is plugged into an outlet. By pushing switch 26, the hot plate 16 will heat. From the insertable funnel 22, the coffee will pour into a coffee pot (not shown) located on the hot plate 16. The hot plate 16 will maintain the brewed coffee at a predetermined temperature for drinking.

Figure 2:
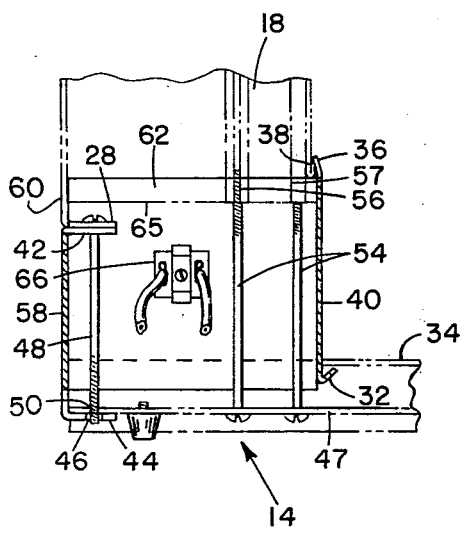
FIG. 2 is a partial sectional view of FIG. 1 along section lines 2—2.

Referring now to FIGS. 1 and 2 in combination, the stand 18 is disconnected from the base 14 by removing bolts (not shown) that normally extend through flange 28 into threaded hole 50 and base 14 into a threaded portion of inward flanges 56 and 57 of the stand 18. By removing these bolts, the stand 18 may be simply lifted off of the base 14. The electrical connection between the hot plate 16 and the switch 26 is also disconnected. Now, the adapter 12 is placed into position by inserting forward flange 32 under the top 34 of the base 14. Since the adapter 12 has an identical rectangular configuration with the stand 18, the adapter 12 will fit in the same position as previously occupied by the stand 18.

A lower front flange 38 of the stand 18 is bent against the stand 18. Previously lower front flange 38 was substantially the same as forward flange 32 of the adapter 12. The bent flange 38 is received inside of a forward wall 40 of adapter 12. On the rear of adapter 12 is located an upper forward flange 42 that abuts against flange 28 of the stand 18. A lower forward flange 44 extends under the base 14. Through the threaded hole 50 in the base 14 and clearance hole 46 in lower forward flange 44, the upper forward flange 42 of the adapter 12 is connected to flange 28 of the stand 18 by a bolt 48. By tightening bolt 48 in the threaded hole 50, the stand 18 is securely attached to the base 14 with the adapter 12 inserted therebetween. Likewise, bolts 54 extend through suitable holes in the base 14 into the threaded portion of inward flanges 56 and 57 of the stand 18. By the tightening of bolts 54, the stand 18 is pulled tightly into position against adapter 12.

It should be specifically noted that the rear wall 58 of the adapter 12 is flush with the rear wall 60 of the stand 18. The side walls 62 and 64 of the adapter 12 receive the side walls 65 of the stand 18 inside of the adapter 12, the same as side walls 65 were previously received inside the base 14. Corner posts 72 and ribs 74 of stand 18 stop shortly before the bottom of side walls 65 to form lower shoulders that had previously rested against the top 34 of base 14. Now the lower shoulders rest against the top of side walls 62 and 64 of adapter 12.

Figure 3:
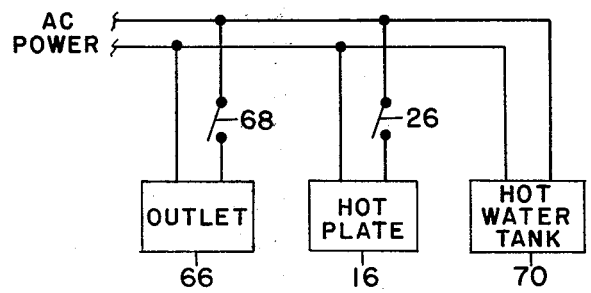
FIG. 3 is an electrical schematic for connecting the plug of the adapter to the electrical connection of the coffee brewer shown in FIG. 1.

Now that the adapter 12 is securely in position, the electrical connection to the hot plate 16 is reconnected. Referring now to FIG. 3, there is shown an electrical schematic for the brewer 10 with the adapter 12 inserted. By plugging in the brewer 10, AC power is connected to the hot water tank 70 and the switch 26, the same as before the adapter 12 was inserted. The switch 26 controls current flow to the hot plate 16. The switch 68 and outlet 66 have been added with the insertion of the adapter 12 and by connection to AC power.

Plug 66 allows an additional outlet to which any particular device may be connected. However, plug 66 was specifically incorporated in the adapter 12 so that an additional heating element may be plugged therein, which additional heating element can be used to maintain a pot of coffee at a given temperature.

By the use of the adapter 12, the stand 18, head portion 20 and the insertable funnel 22 has been raised to allow additional clearance therebelow. The increased clearance between the bottom of insertable funnel 22 and hot plate 16 will now allow a standard twelve cup coffee pot to be inserted therebelow. By simply pouring enough water through top 24 into the head portion 20, the standard eight cup coffee brewer 10 will now brew twelve cups of coffee. Because the eight cup coffee pots are extremely hard to obtain, this allows the larger twelve cup coffee pots to be used.

I claim:

1. A removable adapter for converting a home size coffee brewer to a commercial size coffee brewer, the brewer including a base with a heating element in a forward portion thereof and a stand connected to a rear portion thereof, said stand having means for connecting to said base, a head portion connected to a top of said stand and extending outwardly therefrom over said heating element, said adapter comprising:

front, rear and side walls conforming to cross sectional configuration of said stand;
a lower front flange connecting to said front wall adapted for extending below an upper surface of the base;
an upper front flange connecting to said front wall, said upper front flange abutting said stand;
upper and lower rear flanges connected to said rear wall, said upper and lower rear flanges being adapted to receive a bolt therethrough for connecting said stand to said base via said adapter; and
said means for connecting said stand to said base securing said adapter therebetween in its operative position.

2. The adapter as recited in claim 1 having plug outlet means in said walls connected to and controlled by switch means, said switch means being connected to power source for said coffee brewer.

* * * * *